United States Patent
Kim et al.

(10) Patent No.: US 9,110,473 B2
(45) Date of Patent: Aug. 18, 2015

(54) APPARATUS AND METHOD FOR CONTROLLING SUN VISOR

(71) Applicant: Hyundai Motor Company, Seoul (KR)

(72) Inventors: Sung Un Kim, Yongin-si (KR); Gideok Kwon, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 93 days.

(21) Appl. No.: 14/107,900

(22) Filed: Dec. 16, 2013

(65) Prior Publication Data

US 2015/0066310 A1  Mar. 5, 2015

(30) Foreign Application Priority Data

Sep. 2, 2013 (KR) .................. 10-2013-0105051

(51) Int. Cl.
*G05D 3/10* (2006.01)
*B60J 3/02* (2006.01)
*G06K 9/00* (2006.01)

(52) U.S. Cl.
CPC ............ *G05D 3/10* (2013.01); *B60J 3/0204* (2013.01); *G06K 9/00791* (2013.01)

(58) Field of Classification Search
CPC ...... G05D 3/10; B60J 3/0204; G06K 9/00791
See application file for complete search history.

(56) References Cited

U.S. PATENT DOCUMENTS

| | | | | |
|---|---|---|---|---|
| 6,811,201 B2 * | 11/2004 | Naik | ............................ | 296/97.2 |
| 7,199,767 B2 * | 4/2007 | Spero | ................................ | 345/7 |
| 2007/0222252 A1 * | 9/2007 | Suzuki et al. | ................ | 296/97.8 |
| 2011/0098894 A1 * | 4/2011 | Zeng et al. | ....................... | 701/49 |
| 2012/0140988 A1 * | 6/2012 | Takahashi | ..................... | 382/103 |

FOREIGN PATENT DOCUMENTS

| | | |
|---|---|---|
| JP | 2007-112300 A | 5/2007 |
| JP | 2008-299591 | * 12/2008 |
| JP | 2010-058633 A | 3/2010 |
| JP | 5181939 B2 | 4/2013 |
| KR | 10-0342226 B1 | 6/2002 |

* cited by examiner

*Primary Examiner* — Michael J Zanelli
(74) *Attorney, Agent, or Firm* — McDermott Will & Emery LLP

(57) ABSTRACT

A sun visor control apparatus is provided that includes: at least one sun visor, which is provided in a vehicle to block light from being incident therein; a sun visor driver, which drives the at least one sun visor; and at least one camera, which captures an image of the outside of the vehicle. A controller detects a shadow of the vehicle from the image of the outside of the vehicle, calculates a direction of the shadow and a length of the shadow, and controls the sun visor driver so as to block the incident light in consideration of the direction of the shadow and the length of the shadow.

14 Claims, 4 Drawing Sheets

APPARATUS AND METHOD FOR CONTROLLING SUN VISOR

CROSS-REFERENCE TO RELATED APPLICATION

This application claims priority to and the benefit of Korean Patent Application No. 10-2013-0105051 filed in the Korean Intellectual Property Office on Sep. 2, 2013, the entire contents of which are incorporated herein by reference.

TECHNICAL FIELD

The present disclosure relates to a sun visor control apparatus and a sun visor control method. More particularly, the present disclosure relates to a sun visor control apparatus and a sun visor control method which analyze an image which is captured by a camera to control a sun visor.

BACKGROUND

Vehicles may include at least one sun visor which blocks sunlight from shining into a vehicle in order to secure a clear view for the driver and improve the driving environment.

Light shining into a vehicle through a windshield glass or a window may directly shine light into the eyes of a driver, or the light may be reflected onto a vehicle display device, thereby reducing visibility of the display device, such that the driver may manipulate the sun visor to block inflow of the light.

Further, the driver may not know exactly the direction of the inflow path of the light, such that that the driver needs to manipulate a light blocking device, such as a sun visor, several times.

Further, in order to eliminate a phenomenon of light reflecting onto a display device in the vehicle the driver may attach a light reflection reducing film onto the display device or change a direction of the display device.

However, when the driver manipulates the sun visor and the display device during the driving, the driver may be distracted. Further, when the reflection reducing film is attached onto the display device, a display quality may be deteriorated.

Therefore, a sun visor control apparatus which may easily block the light flowing into the vehicle is required.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a sun visor control apparatus and a sun visor control method which effortlessly blocks light from shining into a vehicle.

The present disclosure has been made in an effort to further provide a sun visor control apparatus and a sun visor control method which block a path of light flowing into a vehicle to minimize disturbance light. The present disclosure has been made in an effort to further provide a sun visor control apparatus and a sun visor control method which improves a visibility of a display device in a vehicle.

An exemplary embodiment of the present disclosure provides a sun visor control apparatus including at least one sun visor which is provided in a vehicle in order to block light from being incident therein. A sun visor driver drives the at least one sun visor. At least one camera captures an image of the outside of the vehicle. A controller detects a shadow of the vehicle from the image of the outside of the vehicle, calculates a direction of the shadow and a length of the shadow, and controls the sun visor driver so as to block the incident light in consideration of the direction of the shadow and the length of the shadow.

In certain embodiments, the controller may detect a dark portion within a predetermined region of the image of the outside of the vehicle as a shadow.

In certain embodiments, the controller may detect the shadow using a saturation of the image of the outside of the vehicle. In this case, the controller may calculate a direction of the shadow in consideration of a position where the camera of the vehicle is provided.

In the meantime, the controller may determine a position where the light is incident with respect to the vehicle using the direction of the shadow and control the sun visor driver so that the sun visor is driven to the position corresponding to where the light is incident.

The controller may calculate a relative incident angle of the light with respect to the vehicle using the length of the shadow to control the sun visor driver in accordance with the incident angle of the light.

The controller may determine an intensity of the light from the image of the outside of the vehicle and control the sun visor driver only when the intensity of the light is equal to or larger than a reference value.

Another exemplary embodiment of the present disclosure provides a sun visor control method including capturing an image of the outside of a vehicle, and detecting a shadow of the vehicle from the image of the outside of the vehicle. A direction of the shadow and a length of the shadow are calculated. At least one sun visor is driven so as to block the light from being incident in consideration of the direction of the shadow and the length of the shadow.

The detecting of the shadow of the vehicle may detect a dark portion within a predetermined region of the image of the outside of the vehicle as a shadow.

Further, the detecting of the shadow of the vehicle may detect the shadow using a saturation of the image of the outside of the vehicle. In this case, the calculating of a direction of the shadow and a length of the shadow may calculate the direction of the shadow in consideration of a position where the camera of the vehicle is provided.

In the meantime, the driving of a sun visor may be determined by an incident position of the light with respect to the vehicle using the direction of the shadow and drive the sun visor corresponding to the incident position of the light.

The driving of the sun visor calculates a relative incident angle of the light with respect to the vehicle using the length of the shadow to drive the sun visor in accordance with the incident angle of the light.

The driving of the sun visor which is provided in the vehicle may determine an intensity of the light from the image of the outside of the vehicle and drive the sun visor only when the intensity of the light is equal to or larger than a reference value.

Advantages of a sun visor control apparatus and a sun visor control method according to an exemplary embodiment of the present disclosure will be described below.

According to at least one of exemplary embodiments of the present disclosure, the light shining into the vehicle is blocked so that a driver may safely drive the vehicle.

According to at least one of exemplary embodiments of the present disclosure, a visibility of a display device which is provided in a vehicle is improved.

DETAILED DESCRIPTION

Hereinafter, a vehicle control apparatus, a sun visor control apparatus, and a sun visor control method according to the present disclosure will be described in detail with reference to the drawings. A suffix for a constituent element which will be used in the following description, such as a "module" and a "unit" is assigned or mixed only for consideration of convenience of description of the specification but does not have distinguishable meaning or function.

Figure 1:
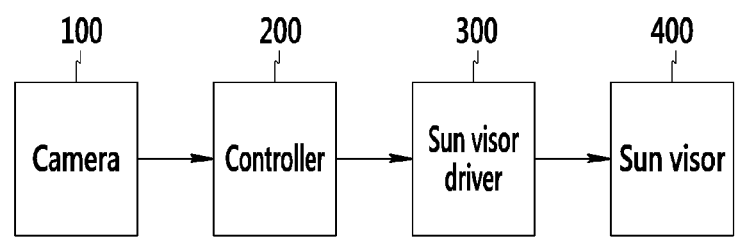
FIG. 1 is a block diagram illustrating a sun visor control apparatus according to an exemplary embodiment of the present disclosure.

FIG. 1 is a block diagram illustrating a sun visor control apparatus according to an exemplary embodiment of the present disclosure. As illustrated in FIG. 1, a sun visor control apparatus may include a camera 100, a controller 200, a sun visor driver 300, and a sun visor 400. However, the sun visor control apparatus including more or fewer constituent elements may be implemented.

The camera 100 processes an image frame such as a still image or a motion image which is obtained by an image sensor. The processed image frame may be output to the controller 200. At least one camera 100 may be provided inside or outside a vehicle.

Next, the controller 200 may detect a shadow of the vehicle from the image output from the camera 100. The controller 200 may calculate a direction and a length of the detected shadow of the vehicle. The controller 200 may control the sun visor driver 300 to block light from being incident into the vehicle in consideration of the direction and the length of the shadow of the vehicle.

In certain embodiments, the controller 200 may display the image output from the camera 100 on a display device (not illustrated) in the vehicle.

Various exemplary embodiments described herein may be implemented in a recording medium which may be read by a computer or a similar device using software, hardware, or combination thereof.

When the exemplary embodiment is implemented by hardware, the exemplary embodiment described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for implementing other functions. In some cases, the exemplary embodiment which is described in the specification may be implemented by the controller 200.

When the exemplary embodiment is implemented by software, the exemplary embodiment such as procedures and functions described herein may be implemented by separate software modules. Each software module may perform at least one function and operation described in the specification. A software code may be implemented by a software application which is written by an appropriate program language. The software code may be executed by the controller 200.

The sun visor driver 300 is driven in accordance with the control of the controller 200 to change a length, an angle, or a position of the sun visor 400. The sun visor driver 300 may include a driving device such as a motor or an actuator. By doing this, the sun visor 400 may block light shining from the outside.

Hereinafter, a vehicle in which a camera 100 and a sun visor 400 of the sun visor control apparatus are provided will be described with reference to FIG. 2.

Figure 2:
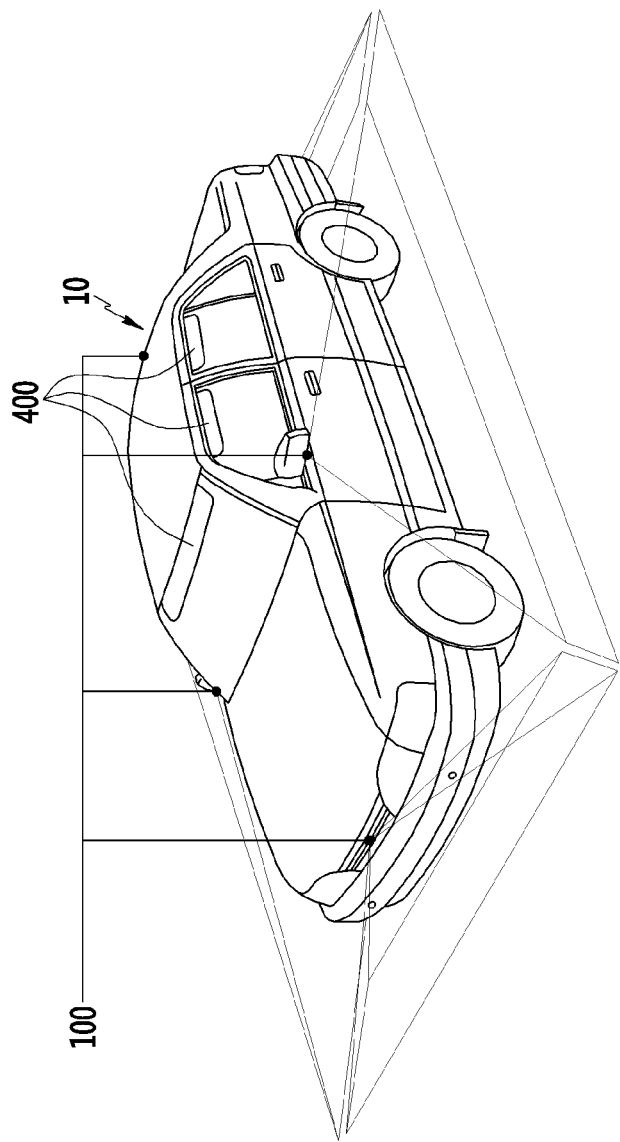
FIG. 2 is an exemplary diagram illustrating a vehicle in which the sun visor control apparatus according to the exemplary embodiment of the present disclosure is provided.

FIG. 2 is an exemplary diagram illustrating a vehicle 10 in which the sun visor control apparatus according to the exemplary embodiment of the present disclosure is provided. As illustrated in FIG. 2, at least one camera 100 may be provided in a vehicle 10. Each camera 100 may capture an outer surrounding image of the vehicle 10 in accordance with a position where the camera 100 is provided.

By doing this, the controller 200 may detect a shadow from the captured image and determine a relative position of a light source with respect to the vehicle 10 in consideration of the position of the camera 100 which captures the image from which the shadow is detected.

The controller 200 may control a sun visor driver 300 so as to drive the sun visor 400 corresponding to the relative position of the light source in order to block the light which is incident into the vehicle 10.

For example, in accordance with the relative position of the light source with respect to the vehicle 10, a path of the light which flows into the vehicle 10 may be changed. By doing this, the controller 200 controls the sun visor driver 300 to be driven such that the sun visor 400 is located in the path of the light.

Figure 3:
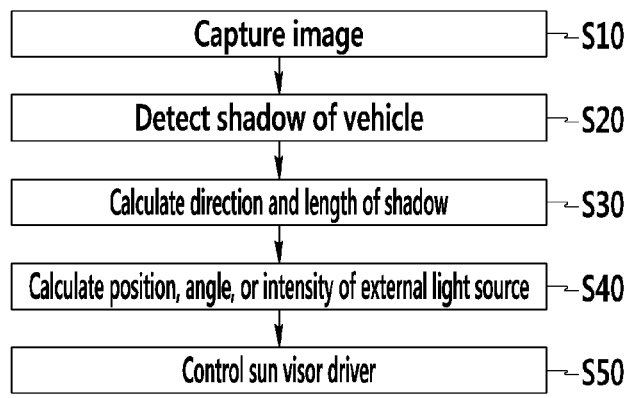
FIG. 3 is a flowchart illustrating a sun visor control method according to an exemplary embodiment of the present disclosure.

Next, a method of controlling a sun visor 400 will be described with reference to FIG. 3. FIG. 3 is a flowchart illustrating a sun visor control method according to an exemplary embodiment of the present disclosure.

First, in step S10, a camera 100 captures an image of an outside of a vehicle 10. In this case, as described with reference to FIG. 2, an image of the outside of the vehicle 10 may be captured by at least one camera 100 which is provided in the vehicle 10. Further, at least one image of the outside of the vehicle 10 which is captured by the at least one camera 100 may be output to the controller 200.

Next, in step S20, the controller 200 detects a shadow of the vehicle from the output image of the outside of the vehicle 10. For example, the controller 200 may detect a dark portion in a predetermined region of the image as a shadow of the vehicle. Alternatively, the controller 200 may detect the shadow of the vehicle using a saturation of the image. The controller 200 may extract a saturation component of the image and then distinguish light and darkness of the saturation to detect the shadow of the vehicle.

Further, the controller 200 may detect the shadow using the following Equation 1.

$$P_{shadow}(i) = \frac{P_{intensity}(i)}{P_{color}(i)} \quad \text{(Equation 1)}$$

Here, $P_{shadow}(i)$ is a threshold value for discriminating the shadow, $P_{intensity}(i)$ is a brightness value of a pixel included in the image of the outside of the vehicle 10, and $P_{color}(i)$ is a color value of the pixel which is included in the image of the outside of the vehicle 10.

That is, the controller 200 calculates individual pixels which are included in the image of the outside of the vehicle 10 using Equation 1 and compares calculated values. When a difference is equal to or larger than a predetermined value, a boundary of two pixels which have a difference may be detected as a boundary of the shadow.

The controller 200 determines the dark portion in the region of interest of the image of the outside of the vehicle 10 as the shadow of the vehicle 10.

In step S30, the controller 200 calculates a direction and the length of the detected shadow of the vehicle. In this case, it is assumed that the direction of the shadow of the vehicle is a relative direction with respect to the vehicle 10. This will be described with reference to FIG. 4.

Figure 4:
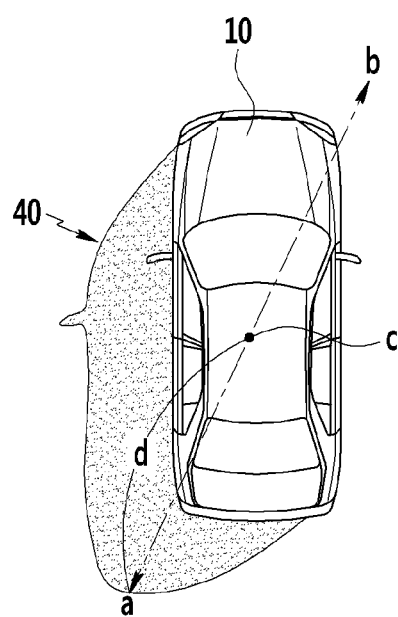
FIG. 4 is an exemplary diagram for determining a position of a light source from a shadow in accordance with the sun visor control method according to the exemplary embodiment of the present disclosure.

FIG. 4 is an exemplary diagram for determining a position of a light source from a shadow in accordance with the sun visor control method according to the exemplary embodiment of the present disclosure. As illustrated in FIG. 4, a shadow 40 of a vehicle 10 may be generated in a surrounding region of the vehicle 10 by an external light source.

For example, the controller 200 sets a central point c of the vehicle 10 and obtains a direction from the central point c to one point a of the shadow of the vehicle which is the farthest from the set central point c of the vehicle 10 as a direction of the shadow 40 of the vehicle. Further, the controller 200 may calculate a length to the one point a of the shadow of the vehicle which is the farthest from the central point c of the vehicle 10 as a length d of the shadow of the vehicle.

Next, in step S40, the controller 200 uses the direction and the length d of the shadow of the vehicle to calculate a position, an angle, or an intensity of the external light source.

As illustrated in FIG. 4, the controller 200 may determine that the external light source is located in a position b opposite to the direction of the shadow 40 of the vehicle.

The controller 200 may calculate an incident angle of the light from the external light source with respect to the vehicle 10 from a height of the vehicle 10 and a length of the shadow 40 of the vehicle. Further, when the dark portion 40 in a predetermined region of the image of the outside of the vehicle 10 is determined as the shadow of the vehicle 10, the controller 200 may calculate the intensity of the external light source in accordance with the brightness of the region other than the dark portion.

In step S50, the controller 200 controls the sun visor driver 300 in accordance with the position, the angle, or the intensity of the external light source.

The controller 200, as described with reference to FIG. 2, may control the sun visor driver 300 to drive the sun visor 400 corresponding to a relative position of the light source in order to block the light which is incident onto the vehicle 10.

Further, the controller 200 may control the sun visor driver 300 so as to drive the sun visor 400 in consideration of the angle of the light source.

For example, when a rotational axis of the sun visor 400 is fixed to the vehicle 10 and the sun visor 400 rotates around the rotational axis in accordance with the driving of the sun visor driver 300, the controller 200 may control the sun visor driver 300 so that a rotational angle is changed in accordance with an angle of the incident light source.

Further, the controller 200 may control the sun visor driver 300 so that the sun visor 400 is driven only when the intensity of the external light source is equal to or higher than a reference value.

The sun visor control apparatus and the sun visor control method according to an exemplary embodiment of the present disclosure detect a shadow of a vehicle 10 which is generated around the vehicle 10 to determine a position of a light source and drives a sun visor 400 so as to block light flowing in the vehicle 10 to increase convenience of a driver and improve an operability of the vehicle 10.

Those skilled in the art will recognize that the present disclosure may be modified in various different ways without departing from the spirit or essential feature of the present disclosure.

Therefore, the detailed description is not restrictively analyzed at all aspects, but rather should be considered as an example. A scope of the present disclosure needs to be determined by a reasonable analysis of appended claims and all changes within an equivalent scope of are included in the scope of the present disclosure.

What is claimed is:

1. A sun visor control apparatus, comprising:
   at least one sun visor provided in a vehicle to block light from being incident therein;
   a sun visor driver which drives the at least one sun visor;
   at least one camera which captures an image of the outside of the vehicle; and
   a controller which detects a shadow of the vehicle from the image of the outside of the vehicle, calculates a direction of the shadow and a length of the shadow, and controls the sun visor driver so as to block the light from being incident in consideration of the direction of the shadow and the length of the shadow.

2. The sun visor control apparatus of claim 1, wherein the controller detects a dark portion within a region of the image of the outside of the vehicle as a shadow.

3. The sun visor control apparatus of claim 1, wherein the controller detects the shadow using a saturation of the image of the outside of the vehicle.

4. The sun visor control apparatus of claim 1, wherein the controller calculates a direction of the shadow in consideration of a position where the camera of the vehicle is provided.

5. The sun visor control apparatus of claim 1, wherein the controller determines a position where the light is incident with respect to the vehicle using the direction of the shadow and controls the sun visor driver so that the sun visor is driven to the corresponding position where the light is incident.

6. The sun visor control apparatus of claim 1, wherein the controller calculates a relative incident angle of the light with respect to the vehicle using the length of the shadow to control the sun visor driver in accordance with the incident angle of the light.

7. The sun visor control apparatus of claim 1, wherein the controller determines an intensity of the light from the image of the outside of the vehicle and controls the sun visor driver only when the intensity of the light is equal to or larger than a reference value.

8. A sun visor control method, comprising:
   capturing an image of the outside of a vehicle;
   detecting a shadow of the vehicle from the image of the outside of the vehicle;
   calculating a direction of the shadow and a length of the shadow; and
   driving at least one sun visor which is provided in the vehicle so as to block the light from being incident in consideration of the direction of the shadow and the length of the shadow.

9. The sun visor control method of claim 8, wherein the detecting of the shadow of the vehicle detects a dark portion within a region of the image of the outside of the vehicle as a shadow.

10. The sun visor control method of claim 8, wherein the detecting of the shadow of the vehicle detects the shadow using a saturation of the image of the outside of the vehicle.

11. The sun visor control method of claim 8, wherein the calculating of a direction of the shadow and a length of the shadow calculates the direction of the shadow in consideration of a position where the camera of the vehicle is provided.

12. The sun visor control method of claim 8, wherein the driving of a sun visor determines an incident position of the light with respect to the vehicle using the direction of the shadow and drives the sun visor corresponding to the incident position of the light.

13. The sun visor control method of claim 8, wherein the driving of the sun visor calculates a relative incident angle of the light with respect to the vehicle using the length of the shadow to drive the sun visor in accordance with the incident angle of the light.

14. The sun visor control method of claim 8, wherein the driving of the sun visor determines an intensity of the light from the image of the outside of the vehicle and drives the sun visor only when the intensity of the light is equal to or larger than a reference value.

\* \* \* \* \*